United States Patent [19]

Münchow et al.

[11] Patent Number: 4,969,621

[45] Date of Patent: Nov. 13, 1990

[54] APPARATUS FOR ADJUSTING SEATS IN MOTOR VEHICLES

[75] Inventors: Andrea Münchow, Remscheid, Fed. Rep. of Germany; Bernd Engels, Battle Creek, Mich.

[73] Assignee: Keiper Recaro GmbH & Co., Remscheid, Fed. Rep. of Germany

[21] Appl. No.: 344,230

[22] Filed: Sep. 4, 1990

[30] Foreign Application Priority Data

May 4, 1988 [DE] Fed. Rep. of Germany ....... 3815080

[51] Int. Cl.$^5$ ............................................. F16M 13/00
[52] U.S. Cl. ...................................... 248/429; 74/352; 297/330; 297/344
[58] Field of Search ................ 248/429, 430, 424, 425, 248/419, 420; 297/330, 344; 74/625, 352

[56] References Cited

U.S. PATENT DOCUMENTS

| | | | |
|---|---|---|---|
| 2,546,685 | 3/1951 | Ashton | 74/625 |
| 4,085,629 | 4/1978 | Fogarollo | 74/625 |
| 4,272,048 | 6/1981 | Kluting et al. | 248/430 |
| 4,641,806 | 2/1987 | Pipon et al. | 248/430 |

FOREIGN PATENT DOCUMENTS

| | | | |
|---|---|---|---|
| 2718928 | 11/1978 | Fed. Rep. of Germany | 248/430 |
| 2747592 | 4/1979 | Fed. Rep. of Germany | 248/429 |
| 2808884 | 9/1979 | Fed. Rep. of Germany | 248/429 |
| 3502345 | 8/1985 | Fed. Rep. of Germany | 297/330 |
| 525646 | 9/1940 | United Kingdom | 248/430 |

*Primary Examiner*—David L. Talbott
*Attorney, Agent, or Firm*—Peter K. Kontler

[57] ABSTRACT

Apparatus for adjusting a seat in a motor vehicle forwardly or backwards has guide rails on the floor of the passenger compartment in the vehicle, seat supporting rails which are movable along the guide rails, toothed racks on the guide rails, pinions meshing with the racks, and a motor-driven transmission with a rotary output element which serves to rotate the pinions in order to move the supporting rails along the guide rails. The shaft which transmits torque to the pinions has an external gear in mesh with an internally toothed portion of an axially movable sleeve which is further provided with an externally toothed portion movable into and from mesh with an internal gear of the output element. A shifting element is provided to move the sleeve axially into and from mesh with the internal gear of the output element. This enables the occupant of the seat or another person to disengage the output element from the shaft in the event of failure of the motor and to permit non-motorical adjustment of the position of the seat. A spring is provided to permanently bias the shifting element to a position in which the output element can transmit torque to the pinions.

16 Claims, 1 Drawing Sheet

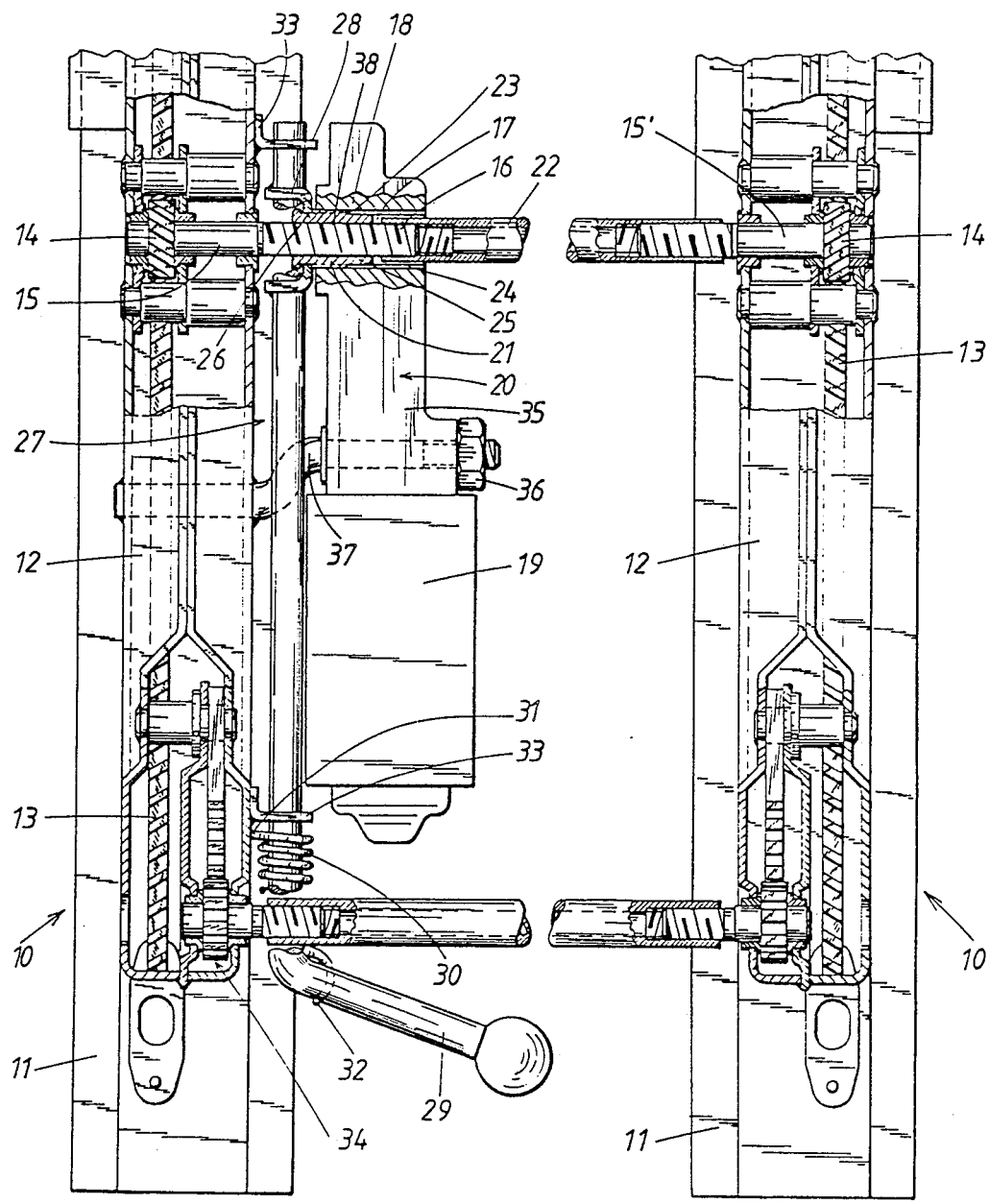

APPARATUS FOR ADJUSTING SEATS IN MOTOR VEHICLES

BACKGROUND OF THE INVENTION

The invention relates to adjusting apparatus in general, and more particularly to improvements in apparatus which can be used with advantage for forward and rearward adjustment of seats in vehicles, for example, of the driver's seat or of the seat next to the driver's seat in a motor vehicle.

It is known to install a seat in a motor vehicle in such a way that the entire seat can be shifted forwardly or backwards for convenience of a short- or long-legged driver or passenger and/or to provide more room for the legs of the occupant or occupants of a rear seat. As a rule, the floor of the passenger compartment is provided with a pair of spaced-apart guide rails which extend in the longitudinal direction of the vehicle and serve to support and guide second rails which are provided at the underside of the body-supporting portion of the seat. One set of rails is provided with toothed racks and the other set of rails supports pinions which mate with the adjacent racks and are connected to each other by a transversely extending torque-transmitting shaft. The shaft can be rotated by the output element of a motor-driven transmission. The motor and transmission are connected with those rails which carry the pinions and their shaft.

An adjusting apparatus of the above outlined character is disclosed, for example, in German Offenlegungsschrift No. 27 47 592 of Klüting. The apparatus of Klüting employs a slip clutch which is interposed between the output element of the transmission and the shaft for the pinions which mate with the toothed racks. The slip clutch is designed in such a way that it is capable of transmitting torque from the output element of the transmission to the shaft for the pinions under normal circumstances but permits the output element to rotate relative to the shaft when the forward or rearward movement of the seat is impeded e.g., by an object in front of or behind the forwardly and rearwardly adjustable seat or by the legs of the occupant or occupants of the seat or seats behind the adjustable seat. Moreover, the torque which the slip clutch can transmit is selected with a view to ensure that the rearwardly moving seat cannot injure an occupant of the seat behind the adjustable seat, i.e., rearward movement of the adjustable seat is interrupted or prevented if the rear part of the seat reaches the leg or legs of a person sitting behind the adjustable seat.

A drawback of the adjusting apparatus of Klüting is that the seat cannot be adjusted at all, or only in response to exertion of a substantial effort, if the motor fails or is out of commission for another reason. A person attempting to shift the seat forwardly or backwards is then required to overcome the resistance which the slip clutch offers to rotation of the common shaft for the pinions. This can present problems, especially to a person occupying the adjustable seat.

German Offenlegungsschrift No. 27 33 484 to Wirtz et al. discloses a seat adjusting apparatus wherein the motor which is used to bring about a change of inclination of the back rest of a seat in a motor vehicle can be detached from the inclination changing mechanism. A screw must be rotated to disengage a clutch disc which normally transmits torque between a common pintle for pivotable leaves forming part of hinges which connect the pivotable back rest to the body supporting portion of the seat and a gear which can be driven by the motor and is rotatable on the shaft. The screw must be rotated by a suitable tool to move the clutch disc axially of the shaft and the screw is rotatably mounted in the shaft. Manipulation of the screw by a screwdriver or a like tool is possible or convenient only when a person wishing to detach the motor from the shaft does not occupy the seat. Moreover, such person is likely to disengage the screw from the shaft instead of disengaging the motor from the shaft. Still further, the motor cannot be used to move the seat forwardly or backwards.

OBJECTS OF THE INVENTION

An object of the invention is to provide a novel and improved apparatus which can be used to adjust a part or device, such as the seat in a motor vehicle, either by way of a motor or by hand or legs with the exertion of a relatively small effort.

Another object of the invention is to provide the apparatus with novel and improved means for disengaging the motor from the seat displacing mechanism.

A further object of the invention is to provide a novel and improved torque-transmitting connection between one or more pinions and a motor-driven transmission in he above outlined apparatus.

An additional object of the invention is to provide a motor vehicle which embodies one or more apparatus of the above outlined character.

Still another object of the invention is to provide an apparatus wherein the motor can be disconnected from the pinion or pinions in a simple and time-saving manner and with the exertion of a minimal effort.

A further object of the invention is to provide an apparatus wherein the motor can be completely disengaged from the pinion or pinions so that the position of a seat or another part can be changed without the need to overcome the resistance of the motor to such change.

Another object of the invention is to provide an apparatus wherein the means for attaching the motor to or for detaching the motor from one or more pinions can be used as a device for locking the manually adjusted object in the newly selected position.

SUMMARY OF THE INVENTION

The invention is embodied in a motion transmitting apparatus, particularly in an apparatus which can be used to move a seat forwardly and backwards. Such seats can be used with advantage in motor vehicles.

The improved apparatus comprises at least one stationary guide member which defines an elongated path, at least one mobile supporting member which is adjacent the guide member and is movable along the path, displacing means including at least one toothed rack provided on one of the members (preferably on the guide member) and at least one pinion mating with the rack and rotatably journalled in or on the other member, drive means associated (e.g., movable) with the other member and having a rotary output element, and means for releasably coupling the output element to the pinion. The coupling means comprises a mobile coupling element and means for moving the coupling element between a first position in which the coupling element establishes a torque-transmitting connection between the output element of the drive means and the pinion, and a second position in which the torque-transmitting connection is interrupted.

The guide member can comprise a fixed rail which can be secured to the floor in the passenger compartment of a motor vehicle, and the supporting member can include a second rail which carries the seat in the passenger compartment of the vehicle. The pinion has a shaft and the output element has an axial hole. The coupling element preferably comprises a sleeve which is extends into the hole of the output element and surrounds the shaft, at least in the first position of the coupling element. The output element of the drive means in such apparatus is preferably provided with an internal gear in the hole, and the shaft has an external gear. The sleeve has an externally toothed portion which meshes with the internal gear of the output element in the first position of the coupling element, and the sleeve further comprises an internally toothed portion which meshes with the gear of the shaft in the first position of the coupling element. At least one of the two toothed portions of the sleeve is out of mesh with the respective gear in the second position of the coupling element.

The hole of the output element can constitute a through hole or bore. The drive means can include a motor and a transmission which is driven by the motor and includes the output element. The latter can be rotatably mounted in the case or housing of the transmission.

In accordance with a presently preferred embodiment, the guide member comprises two fixed parallel first rails and the supporting member comprises two parallel second rails each of which is adjacent and movable along one of the first rails. The displacing means then preferably comprises a toothed rack on each rail of the one member and a pinion rotatably mounted on each rail of the other member and mating with the adjacent rack. Such apparatus can further comprise a torque-transmitting element which operates between the two pinions. The torque transmitting element can include or constitute a second shaft which is coaxial with the shaft of the at least one pinion and is drivingly connected to the other pinion. One of these shafts has an internal gear and the other shaft has an external gear in mesh with the internal gear. The arrangement is preferably such that the external gear is provided on the shaft of the one pinion, and such external gear meshes with the internally toothed portion of the sleeve, at least in the first position of the coupling element.

The sleeve can further include a bearing (e.g., in the form of a short cylinder) which extends into the hole of the output element at least in the second position of the coupling element.

The sleeve is movable axially between the first and second positions, and the means for moving the coupling element includes means for moving the sleeve axially. The sleeve includes a portion which is located externally of the output element in each position of the coupling element and is provided with an external groove. The moving means for such sleeve can include an entraining portion (e.g., a fork) which extends into the groove. The moving means further comprises a shifting element which is movably (e.g., turnably) mounted on the other member and has a handgrip portion movable between a first position corresponding to the first position of the coupling element and a second position corresponding to the second position of the coupling element. Still further, the apparatus can comprise means for yieldably biasing the shifting element to its first position in which the sleeve of the coupling element is ready to rotate the one pinion in response to starting of the motor of the drive means. The biasing means can include at least one spring, particularly a torsion spring which reacts against the other member and bears against the shifting element to turn the latter to a position corresponding to the first position of the coupling element. At least a portion of the torsion spring can surround the shifting element.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single Figure of the drawing is a fragmentary partially plan and partially horizontal sectional view of an apparatus which embodies one form of the invention and can be used to move a seat forwardly or backwards, the coupling element being shown in a position in which the drive means is ready to rotate two coaxial pinions in order to move the seat forwardly or rearwardly.

DESCRIPTION OF PREFERRED EMBODIMENTS

The drawing shows an apparatus which can be used to move a seat (not shown) in a motor vehicle forwardly or backwards. Seats which can be moved by the apparatus of the present invention are disclosed, for example, in commonly owned U.S. Pat. No. 4,786,110 to Mahling et al. and in commonly owned U.S. Pat. No. 4,804,226 to Schmale. The improved apparatus comprises a guide member 10' which can be secured to the floor in the passenger compartment of a motor vehicle and includes two spaced apart parallel guide rails 11 extending in the longitudinal direction of the vehicle. A seat supporting member of the apparatus comprises two rails 12 each of which is adjacent one of the rails 11 and is guided by the respective rail 11 for movement along an elongated path extending in parallelism with the rails 11. The manner in which the supporting rails 12 can be fixedly secured to the underside of the body supporting portion of a seat in a motor vehicle forms no part of the present invention.

The means for displacing the rails 12 relative to the rails 11 comprises two elongated toothed racks 13 which are affixed to or form integral parts of the guide rails 11 and are parallel to all of the rails, and two coaxial pinions 14 each of which mates with one of the racks 13 and which are rotatably mounted in or on the respective supporting rails 12. The left-hand pinion 14 of the illustrated apparatus has a shaft 15 which extends toward the other pinion 14 and includes an external gear 16. The term gear is used herein in its broadest sense and is intended to embrace splined shafts and like rotary parts capable of receiving torque from or of transmitting torque to coaxial parts which are movable axially of the gears or vice versa. The gear 16 can have one or more axially parallel teeth (e.g., in the form of keys which alternate with splines) so that it can mesh with an internal gear which has complementary teeth (e.g., in the form of keys alternating with splines).

The gear 16 extends into the internal gear of a hollow torque transmitting shaft 22 which drives the shaft 15' of the right-hand pinion 14. In addition, the gear 16 extends with clearance through an axial through hole or bore 17 in an output element 18 which is rotatable in the case 35 of a transmission 20 on the left-hand rail 12. The case 35 is separably affixed to the adjacent rail 12 by one or more units 36 on bolts 37 which are welded to the rail 12 and extend through the case 35.

The transmission 20 forms part of a drive for the pinions 14, and such drive further includes a reversible electric or other suitable motor 19 which is affixed to the case 35 and can be started in a desired direction by the occupant of the seat which is mounted on the supporting rails 12 in a manner not forming part of the invention. The output element of the motor 19 drives the input element of the transmission 20 to thereby rotate the output element 18 in a desired direction. The output element 18 has an internal gear 24 which surrounds the hole 17 and normally meshes with an externally toothed portion 23 of a sleeve-like coupling element 21 (hereinafter called sleeve) which extends into the hole 17 and a portion of which projects from the output element 18 toward the left-hand pinion 14. Such portion of the sleeve 21 is formed with an annular external groove 26.

The sleeve 21 forms part of a mechanism which serves to separably couple the gear 16 on the shaft 15 of the left-hand pinion 14 to the drive including the motor 19 and its transmission 20. Such mechanism further comprises means for moving the sleeve 21 axially between the illustrated first position in which the sleeve establishes a torque-transmitting connection between the output element 18 and the shaft 15, and a second position in which the output element 18 can rotate with reference to the gear 16 and vice versa. The moving means comprises a turnable shifting element 27 having a fork 28 at one end and a handgrip element 29 at the other end. The fork 28 extends into the groove 26 and constitutes a means for displacing the sleeve 21 in response to turning of the shifting element 27 by way of the handgrip element 29 between a first position (shown in the drawing) corresponding to the first axial position of the sleeve 21 and a second position which corresponds to the second axial position of the sleeve. The shifting element 27 is turnable in brackets 33 which are welded to the adjacent supporting rail 12.

The apparatus further comprises means for yieldably biasing the shifting element 27 to its first position (in which the sleeve 21 transmits or can transmit torque between the output element 18 and the shaft 15) to thus ensure that the motor 19 is disengaged from the shafts 15, 22 and 15' only as long as the handgrip element 29 is grasped by hand to maintain the shifting element 27 in the second position. The illustrated biasing means comprises a stressed torsion spring 30 which surrounds a portion of the shifting element 27 and has a first leg 31 reacting against the adjacent rail 12 and a second leg 32 bearing against the handgrip element 29 and tending to turn the shifting element 27 from the position which is shown in the drawing.

The sleeve 21 has an internally toothed portion 38 which is in permanent mesh with the gear 16 of the shaft 15. The sleeve 21 further comprises a cylindrical bearing 25 which is surrounded by the output element 18 and on which the output element rotates when the sleeve 21 is moved to its second axial position in which the output element 18 can rotate relative to the pinions 14 and vice versa. The outer diameter of the bearing 25 equals or closely approximates the diameter of the hole 17 in the output element 18.

The reference character 34 denotes a mechanism which is used to move the supporting rails 12 up and down in order to raise or lower the body supporting portion of the seat. The details of the mechanism 34 form no part of the present invention.

If the occupant of the seat or another person wishes to adjust the rails 12 forwardly or backwards, the controls for the motor 19 are actuated in the desired direction so that the output element 18 of the transmission 20 rotates the sleeve 21 which, in turn, rotates the gear 16 of the shaft 15. The shaft 15 then directly drives the left-hand pinion 14 and indirectly drives the right-hand pinion 14 through the medium of the shafts 22 and 15'. The pinions 14 roll along the respective toothed racks 13 and move the supporting rails 12 in the desired direction. The torsion spring 30 maintains the shifting element 27 in that angular position in which the externally toothed portion 23 of the sleeve 21 meshes with the internal gear 24 of the output element 18 and the internally toothed portion 38 of the sleeve 21 meshes with the gear 16 of the shaft 15.

If the motor 19 is out of commission or is not capable of rotating the output element 18 for any other reason, the seat on the supporting rails 12 can be shifted forwardly or backwards in response to turning of the shifting element 27 to its second position against the resistance of the torsion spring 30. The fork 28 then displaces the sleeve 21 so that the latter assumes its second position in which at least one of its toothed portions 23, 38 is out of mesh with the respective gear 24, 16. At the same time, the bearing 25 ensures that the orientation of the shaft 15 remains unchanged, i.e., the shaft 15 remains in that position in which it is coaxial with the shafts 22 and 15'. In the illustrated apparatus the internally toothed portion 38 of the sleeve 21 is in permanent mesh with the gear 16 of the shaft 15 but the externally threaded portion 23 is out of mesh with the internal gear 24 of the output element 18 when the sleeve 21 is moved to its second position in response to turning of the shifting element 27 against the resistance of the torsion spring 30.

When the movement of the sleeve 21 to its second position is completed, the occupant of the seat on the supporting rails 12 can plant her or his feet against the floor prior to pushing or pulling the seat and the rails 12 forwardly or backwards, i.e., along the paths which are defined by the floor-mounted guide rails 11. When the adjustment without assistance from the motor 19 is completed, the handgrip element 29 is simply released to enable the torsion spring 30 to turn the shifting element 27 to the illustrated angular position, i.e., the sleeve 21 returns into mesh with the output element 18 to thereby hold the seat in the newly selected position. The transmission 19 can include or constitute a self-locking worm gear transmission which acts as a means for reliably holding the seat in the manually or pedally (non-motorically) selected position.

An advantage of the improved apparatus is that the drive including the motor 19 and transmission 20 offers no resistance to adjustment of the supporting rails 12 relative to the guide rails 11 when the coupling including the sleeve 21 is actuated to disconnect the motor 19 from the pinions 14. Moreover, the motor 19 and transmission 20 can serve as a means for locking the supporting rails 12 in positions which are selected without assistance from the motor. All a person wishing to secure the seat in the newly selected position has to do is to release the handgrip element 29 so that the torsion spring 30 is free to return the externally toothed portion 23 of the sleeve 21 into mesh with the internal gear 24 of the output element 18.

Another advantage of the improved apparatus is its simplicity. Thus, a person desiring to adjust the supporting rails 12 relative to the guide rails 11 When the motor 19 is out of commission, or cannot be used for such adjustment for any other reason, need not employ any tools and/or possess any technical skills because the adjustment is extremely simple and takes up little time. All that is necessary is to temporarily move the sleeve 21 out of mesh with the output element 18 of the drive for the pinions 14. The apparatus is ready for motorical adjustment of the position of supporting rails 12 relative to the guide rails 11 as soon as the non-motorical adjustment is completed, i.e., the person occupying the seat on the rails 12 or another person knows that it is possible to use the motor 19 as a means for adjusting the position of the seat until and unless the handgrip element 29 is caused to turn the shifting element 27 from the position which is shown in the drawing.

The improved apparatus is susceptible of many modifications without departing from the spirit of the invention. For example, the illustrated turnable shifting element 27 can be replaced with an electromagnet, with a pusher or with any other suitable means for shifting the sleeve 21 between its first and second positions.

It is further possible to provide the toothed racks 13 on the supporting rails 12 and to mount the pinions 14 and the drive means including the motor 19 and transmission 20 on the floor next to one of the guide rails 11. However, the illustrated mounting of toothed racks 13 on the guide rails 11 is preferred at this time because the shifting element 27 then shares the movements of the supporting rails 12. This ensures that a person occupying the seat on the supporting rails 12 can immediately locate the handgrip element 29 because the (axial) position of the shifting element 27 relative to the seat cannot be changed.

It is also possible to provide the right-hand end portion of the shaft 15 with internal teeth and to provide the left-hand end portion of the torque transmitting shaft 22 with external teeth mating with the internal teeth of the shaft 15.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should are intended to be comprehended within the meaning and range of equivalence of the appended claims.

We claim:

1. Motion transmitting apparatus, particularly for moving forwardly and backwards a seat in a vehicle, comprising at least one stationary guide member defining an elongated path; at least one mobile supporting member adjacent said guide member and movable along said path; displacing means including at least one toothed rack provided on one of said members and extending longitudinally of said path and at least one pinion mating with said rack and rotatably carried by the other of said members, said pinion having a shaft; drive means associated with said other member and including a motor and a transmission driven by said motor, said transmission having a rotary output element and said output element having an axial through hole; and means for releasably coupling said output element to said pinion, said coupling means comprising a mobile coupling element and means for moving said coupling element between a first position in which said coupling element establishes a torque-transmitting connection between said output element and said pinion and a second position in which said connection is interrupted, said coupling element including a sleeve extending into said hole and surrounding said shaft.

2. The apparatus of claim 1, wherein said guide member comprises a fixed rail and said supporting member includes a second rail.

3. The apparatus of claim 1, wherein said output element has an internal gear in said hole and said shaft has an external gear, said sleeve having an externally toothed portion which meshes with said internal gear in the first position of said coupling element and an internally toothed portion which meshes with said external gear in the first position of said coupling element, at least one of said toothed portions being out of mesh with the respective gear in the second position of said coupling element.

4. The apparatus of claim 1, wherein said transmission has a case and said output element is rotatably mounted in said case.

5. The apparatus of claim 1, wherein said guide member includes tow first rails and said supporting member includes two second rails each adjacent and movable along one of said first rails, said displacing means comprising a toothed rack on each rail of said one member and a pinion for each of said racks, and further comprising a torque-transmitting element between said pinions, said torque-transmitting element having a second shaft which is coaxial with the shaft of said at least one pinion, one of said shafts having an internal gear and the other of said shafts having an external gear mating with said internal gear.

6. The apparatus of claim 5, wherein said external teeth are provided on the shaft of said at least one pinion and said sleeve has an internally toothed portion meshing with said external gear in the first position of said coupling element and an externally toothed portion meshing with an internal gear of said output element in the first position of said coupling element, at least one of said toothed portions being out of mesh with the respective gear in the second position of said coupling element.

7. The apparatus of claim 1, wherein said sleeve has an externally threaded portion meshing with an internal gear of said output element and an internally threaded portion, said shaft including an external gear meshing with said internally threaded portion in the first position of said coupling element, said sleeve further including a bearing which extends into said output element at least in the second position of said coupling element.

8. The apparatus of claim 1, wherein said bearing includes a cylinder.

9. The apparatus of claim 1, wherein said is movable axially between said first and second positions, said moving means including means for moving said sleeve axially between said first and second positions.

10. The apparatus of claim 9, wherein said sleeve includes a portion which is located externally of said output element in each position of said coupling element and has an external groove, said moving means including an entraining portion which extends into said groove.

11. The apparatus of claim 10, wherein said moving means further comprises a shifting element movably mounted on said other member and having a handgrip portion movable between a first position corresponding to the first position of said coupling element and a second position corresponding to the second position of said coupling element.

12. The apparatus of claim 11, wherein said entraining portion includes a fork.

13. The apparatus of claim 11, further comprising means for yieldably biasing said shifting element to the first position thereof.

14. The apparatus of claim 13, wherein said shifting element is turnable between said first and second positions thereof and said biasing means includes a torsion spring which reacts against said other member and bears against said shifting element.

15. The apparatus of claim 14, wherein a portion of said torsion spring surrounds said shifting element.

16. The apparatus of claim 1, wherein said guide member is fixed and said toothed rack is provided on said guide member.

* * * * *

UNITED STATES PATENT AND TRADEMARK OFFICE
CERTIFICATE OF CORRECTION

PATENT NO. : 4,969,621
DATED : November 13, 1990
INVENTOR(S) : Andrea MÜNCHOW et al.

It is certified that error appears in the above-identified patent and that said Letters Patent is hereby corrected as shown below:

On the title page:
Item
[22] FILED:    "Sep. 4, 1990" should read
               --Apr. 27, 1989--.
Col. 8, line 27, "tow" should read --two--;
        line 58, after "said" insert --sleeve--.

Signed and Sealed this

Third Day of March, 1992

Attest:

HARRY F. MANBECK, JR.

*Attesting Officer*    *Commissioner of Patents and Trademarks*